United States Patent Office 2,744,800
Patented May 8, 1956

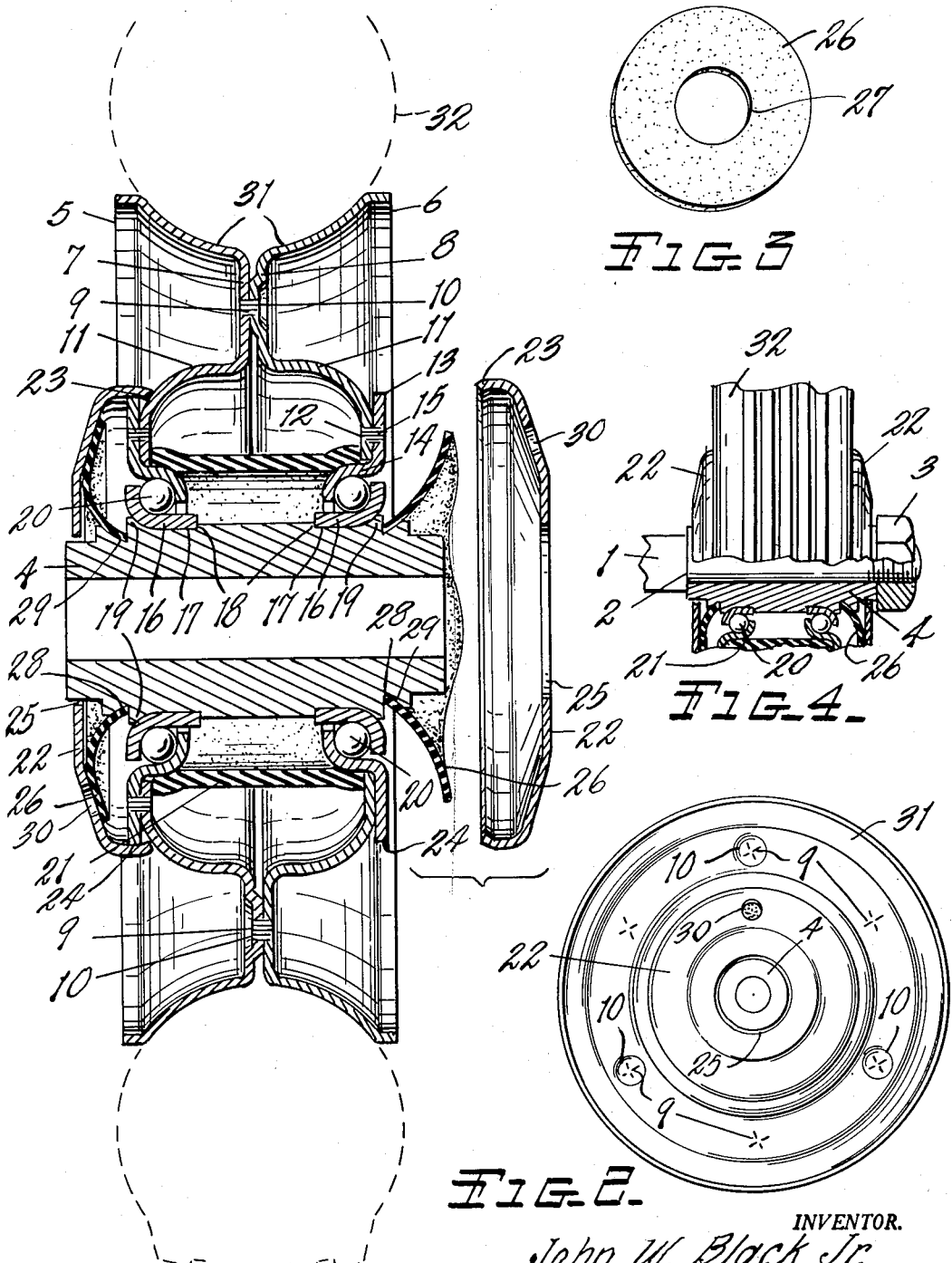

2,744,800

WHEEL AND BEARING ASSEMBLY

John W. Black, Jr., Kalamazoo, Mich., assignor to Pemco Wheel Company, Kalamazoo, Mich.

Application September 27, 1954, Serial No. 458,407

12 Claims. (Cl. 308—187.1)

This invention relates to a wheel and bearing assembly well adapted for use in caster wheels, wheels for lawn mowers and numerous other relations.

The main objects of this invention are:

First, to provide a wheel assembly adapted for uses indicated having anti-friction bearings which may contain lubricant and at the same time the bearings are well protected not only to retain the lubricant but to prevent entrance of foreign matter.

Second, to provide a wheel and bearing assembly in which the parts may be mainly formed as sheet metal stampings and are very economically assembled.

Third, to provide a wheel and bearing assembly which is well adapted for use on a nonrotating spindle and at the same time has lubricant containing bearings which are effectively sealed.

Objects relating to details and economies of the invention will appear from the description to follow. The invention is defined and pointed out in the claims.

A preferred embodiment of the invention is illustrated in the accompanying drawing, in which:

Fig. 1 is an enlarged partially disassembled sectional view of a wheel embodying my invention, a tire being conventionally indicated by dotted lines.

Fig. 2 is a side elevational view of the wheel of my invention with the tire omitted.

Fig. 3 is a perspective view of one of the bearing seal members.

Fig. 4 is a fragmentary view illustrating the adaptability of my wheel and bearing assembly for mounting on a nonrotatable spindle or support.

In the accompanying drawing 1 represents a fixed axle or spindle member having an outwardly facing shoulder 2 and threaded to receive a clamping nut 3 for nonrotatably securing the tubular spindle 4 thereto.

The wheel members, 5 and 6 are formed of sheet metal stampings and include web portions 7 and 8 respectively disposed in side by side relation and spot welded to each other as indicated at 9. To facilitate this spot welding the wheel member webs are provided with angularly spaced bosses 10 of substantial area and height, these alternately projecting from the web members as shown in Figs. 1 and 2. This enables an effective welding using annular electrodes instead of point electrodes and insures the welding the desired points. Further, the bosses maintain the web members in slightly spaced relation permitting the cleaning of or degreasing of the wheel members formed as stampings that is, they permit drainage of the cleaning material which feature however is the subject matter of a copending application of the applicant. The copending application is identified by Serial No. 460,847, filed October 7, 1954, for Wheel and Bearing Assembly.

The wheel members have outwardly offset inner portions 11 terminating in parallel flange-like portions 12 upon which the outwardly projecting flanges 13 of the outer bearing members 14 are fixedly secured by means of the welds 15. The inner bearing members 16 are seated in the annular seats 17 provided therefore on the spindle member 4. These seats having outwardly facing shoulders 18 at their inner ends. The inner bearing members are retained by the upset portions 19 on the spindle member which fixedly and nonrotatably secures the inner bearing members to the spindle members.

In the embodiment illustrated these bearing members are conformed to receive the anti-friction ball bearing elements 20. It should be understood that the bearing members might be conformed to receive tapered or straight roller anti-friction elements. It will be noted that the bearing members are conformed to sustain axial thrust as well as radial load.

A tubular or sleeve-like lubricant chamber member 21 which is desirably a piece of resilient tubing such, for example, as neoprene is disposed between the offset inner portions of the wheel members in embracing relation to the outer bearing members. This is assembled before the wheel is secured to the spindle by means of inner bearing members 16.

The closure members 22 have inturned peripheral flange portions 23 which may be springably engaged over the outer edges 24 of the outer bearing member flanges 13. These closure members have central openings 25 to receive the ends of the spindle. As shown at the left of Fig. 1, the closure members rotate with the wheel as a part thereof.

The lubricant retaining and bearing seal members 26 are formed of resilient material such, for example, as neoprene in the form of flat discs having central openings 27 therein. The spindle member is provided with annular grooves 28, the outer walls 29 of which preferably incline inwardly. The diameter of the grooves exceeds the diameter of the holes 27 in the member 26 so that when the members are engaged in the grooves they tend to flare outwardly as shown in Fig. 2 with their outer edge portions in sliding sealing engagement with the inner sides of the closure members. The closures are provided with lubricant holes 30 which holes are normally closed by members 26. With this arrangement the bearings are housed in what amounts to a closed lubricant chamber and this chamber is protected against the entrance of dust and other matter.

In the embodiment illustrated the wheel members have outwardly flaring portions 31 which form a rim for a tire as indicated at 32. The embodiment of my invention is adapted for many uses where escaping lubricant is objectionable such, for example, as caster wheels, lawn mower wheels and in various other relations.

I have illustrated and described my invention in a highly practical embodiment thereof. I have not attempted to illustrate or describe other embodiments or adaptions as it is believed this disclosure will enable those skilled in the art to embody or adapt my invention as may be desired.

Having thus described my invention, what I claim as new and desire to secure by Letters Patent is:

1. A wheel and bearing assembly comprising a tubular spindle member adapted to be fixedly mounted on a nonrotatable spindle and provided with axially spaced bearing member seats having outwardly facing shoulders at their inner ends, said spindle member having reduced end portions with annular grooves spaced axially inwardly from the reduced portions, wheel members formed as sheet metal stampings and including annular web portions fixedly secured together in side by side relation and outwardly flaring outer portions coacting to constitute a channeled rim and having outwardly offset radially inner portions, outer bearing members having radially outturned flanges at their outer ends lapped upon and fixedly secured to the outer sides of said outwardly offset portions of said wheel members with intermediate portions of the bearing members extending axially inwardly of the offset inner portions of the wheel members, inner bearing members disposed on said bearing member seats of said spindle member, said spindle member being upset into retaining engagement with said inner bearing members with their inner ends in supported engagement with said shoulders, anti-friction bearing elements coacting with outer and inner bearing members, a tubular resilient lubricant chamber wall member disposed between said outwardly offset portions of said wheel members in embracing relation to the axially extending portions of said outer bearing members, closure members having central openings therein receiving the ends of said spindle member and having inwardly directed peripheral flanges detachably engageable with the peripheries of the flanges of said outer bearing members, at least one of said closure members being provided with a lubricant opening, and annular resilient seal members engaged in said grooves in said spindle member to project outwardly therefrom into supported sealing engagement with said closure members and constituting a closure for the said lubricant opening.

2. A wheel and bearing assembly comprising a tubular spindle member adapted to be fixedly mounted on a nonrotatable spindle and provided with axially spaced bearing member seats having outwardly facing shoulders at their inner ends, said spindle member having reduced end portions with annular grooves spaced axially inwardly from the reduced portions, wheel members including annular web portions fixedly secured together in side by side relation and having outwardly offset radially inner portions, outer bearing members having radially outturned flanges at their outer ends lapped upon and fixedly secured to the outer sides of said outwardly offset portions of said wheel members with intermediate portions of the bearing members extending axially inwardly of the offset inner portions of the wheel members, inner bearing members disposed on said bearing member seats of said spindle member, said spindle member being upset into retaining engagement with said inner bearing members with their inner ends in supported engagement with said shoulders, anti-friction bearing elements coacting with outer and inner bearing members, a tubular resilient lubricant chamber wall member disposed between said outwardly offset portions of said wheel members in embracing relation to the axially extending portions of said outer bearing members, closure members having central openings therein receiving the ends of said spindle member and having inwardly directed peripheral flanges detachably engageable with the peripheries of the flanges of said outer bearing members, at least one of said closure members being provided with a lubricant opening, and annular resilient seal members engaged in said grooves in said spindle member to project outwardly therefrom into supported sealing engagement with said closure members and constituting a closure for the said lubricant opening.

3. A wheel and bearing assembly comprising a tubular spindle member adapted to be nonrotatably mounted on a nonrotatable spindle, said spindle member having annular grooves adjacent the ends thereof, the outer walls of the grooves being inclined inwardly, wheel members including web portions secured together in side by side relation and having outwardly offset radially inner portions, outer bearing members having flanges at their outer end fixedly secured to the outer sides of said outwardly offset portions of said wheel members, inner bearing members nonrotatably mounted on said spindle member in axially spaced relation and at the inner side of said grooves, anti-friction bearing elements coacting with outer and inner bearing members, a tubular lubricant chamber wall member mounted on said outer bearing members between said outwardly offset portions of said wheel members, closure members having central openings therein aligned with said spindle member and having inwardly directed peripheral flanges detachably engageable with the peripheries of the flanges of said outer bearing members and having lubricant openings therein, and annular resilient seal members engaged in said grooves in said spindle to project in outwardly flaring relation therefrom into supported engagement with the inner sides of said closure members and constituting a closure for the said lubricant openings.

4. A wheel and bearing assembly comprising a tubular spindle member adapted to be nonrotatably mounted on a nonrotatable spindle, said spindle member having annular grooves adjacent the ends thereof, wheel members including web portions secured together in side by side relation and having outwardly offset radially inner portions, outer bearing members having flanges at their outer end fixedly secured to the outer sides of said outwardly offset portions of said wheel members, inner bearing members nonrotatably mounted on said spindle member in axially spaced relation and at the inner side of said grooves, antifriction bearing elements coacting with outer and inner bearing members, a tubular lubricant chamber wall member mounted on said outer bearing members between said outwardly offset portions of said wheel members, closure members having central openings therein aligned with said spindle member and having inwardly directed peripheral flanges detachably engageable with the peripheries of the flanges of said outer bearing members and having lubricant openings therein, and annular resilient seal members engaged in said grooves in said spindle member to project therefrom into supported engagement with the inner sides of said closure members and constituting a closure for the said lubricant openings.

5. A wheel and bearing assembly comprising a spindle member, wheel members including web portions secured together in side by side relation and having outwardly offset radially inner portions, outer bearing members having flanges at their outer ends fixedly secured to the outer sides of said outwardly offset portions of said wheel members, inner bearing members nonrotatably mounted on said spindle member in axially spaced relation to each other and in spaced relation to the ends of the spindle member, a resilient tubular lubricant chamber wall member mounted on said outer bearing members between said outwardly offset portions of said wheel members, closure members having central openings therein aligned with said spindle member and detachably mounted on the flanges of said outer bearing members, and resilient seal members mounted on said spindle member to project into supported engagement with said closure members.

6. A wheel and bearing assembly comprising a spindle member, wheel members including web portions secured together in lapped side by side relation and having outwardly offset radially inner portions, outer bearing members having flanges at their outer ends fixedly secured to the outer sides of said outwardly offset portions of said wheel members and projecting radially beyond said outwardly offset portions, inner bearing members nonrotatably mounted on said spindle member in axially spaced relation to each other and in spaced relation to the ends of the spindle member, closure members having central openings therein aligned with said spindle member and having axially turned peripheries snapped over the flanges of said outer bearing members, and resilient seal members mounted on said spindle member to project into supported engagement with said closure members.

7. A wheel and bearing assembly comprising a spindle member, wheel members including web portions secured together in side by side relation and having outwardly offset radially inner portions, outer bearing members having flanges at their outer ends fixedly secured to the outer sides of said outwardly offset portions of said wheel members, inner bearing members nonrotatably mounted on said spindle member in axially spaced relation to each other and in spaced relation to the ends of the spindle member, closure members having central openings therein aligned with said spindle member and detachably mounted on the flanges of said outer bearing members, at least one of said closure members having a lubricant opening therein, and resilient seal members mounted on said spindle member to project into supported engagement with said closure members, one of the seal members constituting a closure for the lubricant openings in the closure member.

8. A wheel and bearing assembly comprising a spindle member, fixedly connected wheel members, outer bearing members fixedly mounted on said wheel members to project inwardly therefrom and having radially projecting flanges disposed on the outside of said wheel members with the peripheries of the flanges spaced from the wheel members, inner bearing members nonrotatably mounted on said spindle member in opposed relation to said outer bearing members, anti-friction bearing elements coacting with outer and inner bearing members, a tubular lubricant chamber wall member mounted on said outer bearing members between said wheel members, closure members having central openings therein aligned with said spindle member and having axially turned peripheries snapped over the outer sides of the wheel members, and resilient seal members mounted on said spindle member to project outwardly therefrom into sealing engagement with the inner sides of said closure members.

9. A wheel and bearing assembly comprising a spindle member, fixedly connected wheel members, outer bearing members fixedly mounted on said wheel members to project inwardly therefrom and having radially projecting flanges disposed on the outside of said wheel members with the peripheries of the flanges spaced from the wheel members, inner bearing members nonrotatably mounted on said spindle member in opposed relation to said outer bearing members, antifriction bearing elements coacting with outer and inner bearing members, closure members having central openings therein aligned with said spindle member and having axially turned peripheries snapped over the outer sides of the wheel members, and resilient seal members mounted on said spindle member to project outwardly therefrom into sealing engagement with the inner sides of said closure members.

10. A wheel and bearing assembly comprising a tubular spindle member adapted to be nonrotatably mounted on a nonrotatable spindle, wheel members having web portions secured together in side by side relation and having axially spaced radially inner portions, outer bearing members mounted on said axially spaced portions to rotate therewith, inner bearing members nonrotatably mounted on said spindle in opposed relation to said outer bearing members, antifriction bearing elements coacting with said inner and outer bearing members, a lubricant chamber wall mounted on said wheel member in spaced relation to said spindle, closure members mounted on said wheel to rotate therewith and having openings therein aligned with said spindle member, and resilient seal members mounted on said spindle member within said closure members and having sealing engagement with the inner sides thereof.

11. A wheel and bearing assembly comprising a tubular spindle member adapted to be nonrotatably mounted on a nonrotatable spindle, wheel members having web portions secured together in side by side relation and having axially spaced radially inner portions, outer bearing members mounted on said axially spaced portions to rotate therewith, inner bearing members nonrotatably mounted on said spindle in opposed relation to said outer bearing members, a lubricant chamber wall mounted on said wheel member in spaced relation to said spindle, closure members mounted on said wheel to rotate therewith and having openings therein aligned with said spindle member, and resilient seal members mounted on said spindle member within said closure members and having sealing engagement with the inner sides thereof.

12. A wheel and bearing assembly comprising a tubular spindle member adapted to be nonrotatably mounted on a nonrotatable spindle, wheel members having web portions secured together in side by side relation and having axially spaced radially inner portions, outer bearing members mounted on said axially spaced portions to rotate therewith, inner bearing members nonrotatably mounted on said spindle in opposed relation to said outer bearing members, closure members mounted on said wheel to rotate therewith and having openings therein aligned with said spindle member, and resilient seal members mounted on said sprindle member within said closure members and having sealing engagment with the inner sides thereof.

References Cited in the file of this patent

UNITED STATES PATENTS

| | | |
|---|---|---|
| 2,136,531 | Vogt | Nov. 15, 1938 |
| 2,144,691 | Schmal | Jan. 24, 1939 |
| 2,591,129 | Brouwer | Apr. 1, 1952 |
| 2,643,917 | Douglas et al. | June 30, 1953 |
| 2,686,088 | Nelson | Aug. 10, 1954 |